United States Patent [19]

Goldstein et al.

[11] Patent Number: 5,679,229

[45] Date of Patent: Oct. 21, 1997

[54] ELECTRODIALYSIS INCLUDING FILLED CELL ELECTRODIALYSIS (ELECTRODEIONIZATION)

[75] Inventors: Arthur L. Goldstein, Weston, Mass.; Wayne A. McRae, Mannedorf, Switzerland; Keith J. Sims, Wayland, Mass.

[73] Assignee: Ionics, Incorporated, Watertown, Mass.

[21] Appl. No.: 767,532

[22] Filed: Dec. 16, 1996

Related U.S. Application Data

[62] Division of Ser. No. 571,403, Dec. 13, 1995, Pat. No. 5,679,228, which is a division of Ser. No. 233,092, Apr. 25, 1994, Pat. No. 5,503,729.

[51] Int. Cl.⁶ .................................................. B01D 61/48
[52] U.S. Cl. ...................... 204/524; 205/748; 204/529; 204/533; 204/536
[58] Field of Search .................... 205/748; 204/524, 204/529, 533, 536

[56] References Cited

U.S. PATENT DOCUMENTS

| Re. 24,865 | 9/1960 | Juda et al. | 204/98 |
|---|---|---|---|
| 2,752,306 | 6/1956 | Juda et al. | 204/151 |
| 2,863,813 | 12/1958 | Juda et al. | 204/180 |
| 3,149,061 | 9/1964 | Parsi | 204/180 |
| 3,291,713 | 12/1966 | Parsi | 204/180 |
| 3,510,417 | 5/1970 | Mizutani et al. | 204/180 |
| 3,510,418 | 5/1970 | Mizutani et al. | 204/181 |
| 3,647,086 | 3/1972 | Mizutani et al. | 210/500 |
| 3,847,772 | 11/1974 | Sata et al. | 204/180 P |
| 3,868,314 | 2/1975 | Mizutani et al. | 204/296 |
| 4,298,442 | 11/1981 | Giuffrida | 204/180 P |
| 4,632,745 | 12/1986 | Giuffrida et al. | 204/301 |
| 4,923,611 | 5/1990 | Hanada et al. | 210/638 |
| 5,026,465 | 6/1991 | Katz et al. | 204/182.4 |
| 5,056,996 | 10/1991 | Papastavros et al. | 425/110 |
| 5,066,375 | 11/1991 | Parsi et al. | 204/182.4 |
| 5,094,732 | 3/1992 | Oldani et al. | 204/529 |
| 5,120,416 | 6/1992 | Parsi et al. | 204/182.4 |
| 5,154,809 | 10/1992 | Oren et al | 204/182.4 |
| 5,203,976 | 4/1993 | Parsi et al. | 204/182.4 |
| 5,308,466 | 5/1994 | Ganzi et al. | 204/151 |
| 5,316,637 | 5/1994 | Ganzi et al. | 204/182.4 |

OTHER PUBLICATIONS

Lister (1952) *Canadian Journal of Chemistry* 30:879–889. no month.
Meyer et al. (1940) *Helv. Chim. Acta.* 23:795–800. no month.
Walters et al. (1955) *Ind. Eng. Chem.* 47:61–67. no month.
Cowan et al. (1959) *Ind. Eng. Chem.* 51:1445–1448 no month.

*Primary Examiner*—Arun S. Phasge
*Attorney, Agent, or Firm*—Lappin & Kusmer LLP

[57] ABSTRACT

Improved electrodialysis (ED) stacks are disclosed having one or more components selected from the group:

a) cation exchange membranes having ion exchange groups predominantly sulfonic acid groups and a minor amount of weakly acidic and/or weakly basic groups or membranes which are selective to monovalent cations and simultaneously therewith, cation exchange granules selective to monovalent cations as packing in the dilute compartments;

b) anion exchange membranes having as ion exchange groups only quaternary ammonium and/or quaternary phosphonium groups and substantially no primary, secondary and/or tertiary amine and/or phosphine groups or membranes which are selective to monovalent anions simultaneously therewith, anion exchange granules selective to monovalent anions as packing in the dilute compartments;

c) as packing in the dilute compartment, anion exchange granules which are selective to monovalent anions, or cation exchange granules which are selective to monovalent cations, or cation exchange granules having as exchange groups a predominant amount of sulfonic acid groups and a minor amount of weakly acidic and/or weakly basic groups, or anion exchange granules consisting of organic polymers having as anion exchange groups only quaternary ammonium and/or quaternary phosphonium groups and almost no primary, secondary and/or tertiary amine and/or phosphine groups.

11 Claims, No Drawings

ELECTRODIALYSIS INCLUDING FILLED CELL ELECTRODIALYSIS (ELECTRODEIONIZATION)

This is a divisional of application Ser. No. 08/571,403 filed on Dec. 13, 1995, now U.S. Pat. No. 5,679,228 which is a divisional of application Ser. No. 08/233,092, filed on Apr. 25, 1994 and now U.S. Pat. No. 5,503,729.

BACKGROUND OF THE INVENTION

1. Field of the Invention

The invention pertains to improved electrodialysis ("ED" including "EDR") apparatus and systems including improved filled cell electro-dialysis apparatus and systems and to improved processes which use such apparatus and systems. (Filled cell ED is also known as electrodeionization ("EDI"). Filled cell EDR is also known as reversing electrodeionization ("EDIR")).

2. Description of Prior Art

ED apparatus having a multiplicity of alternating anion selective and cation selective membranes was apparently first described by K. Meyer and W. Strauss in 1940 (Helv. Chim. Acta 23 (1940) 795–800). The membranes used were poorly ion selective. The discovery of ion exchange ("IX") membranes (U.S. Pat. No. Re. 24,865) which had high ion perm-selectivity, low electrical resistance and excellent stability led rapidly to the invention of ED using such membranes (U.S. Pat. No. 2,636,852) and to the growth of an industry using such apparatus, for example, for desalting of brackish water, concentration of sea water and deashing of cheese whey. During the last 40 years approximately 5000 ED plants have been installed on a world-wide basis.

Limitations on ED include:

A. Limiting current density. Because the IX membranes used in ED are highly selective to ions of one sign or the other, a substantial fraction of the ions passing through the membranes must reach the latter by diffusion from the ambient solution through laminar flow layers at the interfaces between the membranes and the solutions being depleted of ions (the "dilute or diluting solutions or streams" as known in the art). The maximum rate of diffusion occurs when the concentration of electrolyte at such membrane interfaces is essentially zero. The current density corresponding to such zero concentration is referred to in the art as the limiting current density. To increase the latter it is necessary to increase the rate of diffusion, for example, by reducing the thickness of the laminar flow layers by flowing the ambient solution rapidly by the membrane surfaces and/or by the use of turbulence promoters. Nevertheless practical limiting current densities are generally in the range of 5,000 to 10,000 amperes per square meter for each kilogram-equivalent of salts per cubic meter of solution (that is 0.5 to 1 amperes per square centimeter for each gram-equivalent per liter). A typical brackish water has a concentration of salts of about 0.05 kg-eq/m$^3$ (that is about 0.05-eq/l or about 3000 parts per million ("ppm") )and therefore a limiting current density in the range of from about 250 to 500 amperes per m$^2$ (0.025 to 0.05 amperes per cm$^2$). In order to maximize the utilization of ED apparatus it is desirable to operate at the highest possible current densities. However as the limiting current density is approached it is found that water is dissociated ("split") into hydrogen ions and hydroxide ions at the interfaces between the (conventional) anion exchange ("AX") membranes and the diluting streams. The hydrogen ions pass into the diluting streams and the hydroxide ions into the adjacent solutions which are being enriched in ions (the "concentrate, concentrated, concentrating or brine solutions or streams" as known in the art). Since brackish water may often contain calcium bicarbonate there is a tendency therefore for calcium carbonate to precipitate at those surfaces of the (conventional) AX membranes which are in contact with the concentrating streams. This problem has been addressed by chemical or IX softening of the feed waters or the concentrating streams; by adding acid to the feed waters or the concentrating streams (with or without decarbonation) or by regularly reversing the direction of passage of the electric current thereby changing the concentrating streams to diluting streams (and the diluting streams to concentrating streams). See U.S. Pat. No. 2,863,813. Of the above, the most successful process has been the last mentioned process referred to in the art as "electrodialysis reversal" ("EDR").

The theory of limiting current in ED shows that in the case of sodium chloride solution for example, the cation exchange ("CX") membranes should reach their limiting current density at values which are about ⅔rds that of the AX membranes. Careful measurements have shown that such is indeed the case. However as the limiting current density of (conventional) CX membranes is approached or exceeded it is found that water is not split into hydroxide ions and hydrogen ions at the interfaces between such CX membranes and the diluting streams. The difference in behavior of (conventional) AX and CX membranes at their respective limiting currents has been explained in recent years as catalysis of water splitting by weakly basic amines in the AX membranes. AX membranes which have only quaternary ammonium anion exchange groups (and no weakly basic groups) initially do not significantly split water as their limiting current is approached. Such behavior continues for only several hours after which period water splitting begins and increases with time. It is found that the AX membranes then contain some weakly basic groups which have resulted from hydrolysis of quaternary ammonium groups. It is concluded that splitting of water at conventional AX membranes at or near their limiting current densities is an unfortunate phenomenon, unavoidable for practical purposes.

The existence of limiting current also means that in dilute solutions the practical current densities are very low. For example at a concentration of salts of about 0.005 kg-eq/m$^3$ (that is about 0.005 g-eq/l or about 300 ppm, a concentration typical of drinking water) the limiting current density is in the range of from about 25 to 50 amperes per m$^2$ (0.0025 to 0.005 amperes per cm$^2$), i.e. the transfer of salts per unit area per unit time is very low (e.g. 50 to 100 grams of salt per hour per square meter). This problem seems first to have been solved by W. Walters et al. in 1955 (Ind. Eng. Chem. 47 (1955) 61–67) who filled the diluting stream compartments in an ED stack with a mixture of strong base and strong acid IX granules. Since then many patents have issued on the subject, among them U.S. Pat. Nos. 3,149,061; 3,291,713; 4,632,745; 5,026,465; 5,066,375; 5,120,416; and 5,203,976. Two modes of operation of such filled cell ED (that is EDI) have been identified. In the first, the IX granules serve as extensions of the membrane surface area thereby greatly increasing the limiting current density. In the second mode a current density is applied which is very much greater than the limiting current density even with the presence of the IX granules. Under these circumstances the rate of water splitting is very high and the IX granules are predominantly in the strong base and strong acid forms respectively. The apparatus in this mode is therefore best described as continuously electrolytically regenerated (mixed bed) ion exchange. (An intermediate mode may be identified in which there is some water splitting but the IX granules are not predominantly in the strong base and strong acid forms resp.).

Most filled cell ED (that is EDI) operates in both modes e.g. in the same cell (first mode near the entrance to the cell, second mode near the exit); in cells in flow series between a single pair of electrodes; or in separate stacks in flow series (each stack with its own pair of electrodes). Filled cell ED is used to replace conventional, chemically regenerated IX systems e.g. strong acid CX column followed by a weakly basic AX column or, at least in part, a mixed bed IX column. In either of the latter cases the CX and AX granules are chemically regenerated separately e.g. with aqueous solutions of sulfuric acid or hydrochloric acid and sodium hydroxide respectively. Precipitates of calcium carbonate, calcium sulfate and magnesium hydroxide are thereby not obtained. The columns of fine granules are effective filters for colloid matter which is rinsed off the granules during the chemical regeneration. In contrast, in the case of EDI any calcium bicarbonate and/or sulfate removed from the diluting stream occurs in a higher concentration in the concentrating stream, particularly when it is desired to achieve high recoveries of the diluting stream (which is the usual case). Such higher concentrations frequently result in precipitation in the concentrating stream. Furthermore, it is inconvenient (though technically possible) to back-wash the IX granules in a filled cell ED apparatus thereby removing any colloidal matter which may have been filtered out. These problems with EDI are generally solved by pretreatment for example:

regenerable cation exchange for softening followed by regenerable anion exchange absorbents for colloid removal;

ultrafiltration or microfiltration for colloid removal followed by EDR for softening and partial demineralization; or ultrafiltration or microfiltration for colloid removal followed by nanofiltration for softening or reverse osmosis for softening and partial demineralization.

As pointed out above, filled cell ED is used to replace, at least in part, a mixed bed IX column. The latter however generally produces water having an electrical resistivity of about 18 meg ohm-cm and silica concentrations near the present limits of detection. Such performance by filled cell ED (EDI) has been difficult to achieve until now.

B. Removal of poorly ionized substances:

ED (including EDR) is used in many plants to deash cheese whey. Generally the natural whey is first concentrated to the range of 20 to 25 percent solids by weight. The current density (that is the rate of removal of ash per unit area of membrane per unit time) during ED (or EDR) of such concentrated whey remains high until about 50 to 60 percent of the ash is removed. The remaining ash behaves as if it is poorly ionized, perhaps associated or complexed with protein in the whey. An important market for deashed whey requires 90 percent or more deashing. To deash from 40 percent ash to 10 percent ash by ED (including EDR) may require much more apparatus contact time than to deash from 100 percent to 40 percent ash. The problem may be solved by the more or less continuous addition of acid to the whey during deashing from 40 to 10 percent ash, the acid apparently freeing the ash from the protein. However such added acid is rapidly removed by ED (including EDR) and the quantities of acid required are therefore undesirable. The problem has also been solved by removing about 60 percent of the whey ash by ED (including EDR) and removing most of the remaining 40 percent by ion exchange. The latter generally consists of a column of strong acid CX granules followed by a column of weak base AX granules. Considerable quantities of acid and base are required to regenerate the IX granules.

SUMMARY OF THE INVENTION

Objects of this invention include:

to improve the removal of silica by ED including filled cell ED (that is EDI or EDIR);

to ameliorate the problems of precipitation of poorly soluble calcium and magnesium compounds during ED, EDR, EDI or EDIR;

to provide an apparatus and a process for softening water which apparatus and process do not require chemical regeneration;

to provide an apparatus and a process more efficiently deash liquid, milk products to high levels of deashing;

to provide an apparatus and a process to more efficiently to remove nitrate, nitrite and other monovalent anions from water in preference to divalent anions;

to provide an apparatus and a process more efficiently to remove monovalent ions of one sign from water or other liquids in preference to divalent ions of the opposite charge sign;

to provide an apparatus and a process more efficiently to remove monovalent ions of both signs from water in preference to divalent ions of both signs;

to provide an apparatus and a process more efficiently to produce hypochlorous acid and/or alkali hypochlorite solutions which have a low concentration of free chloride ion.

DETAILED DESCRIPTION OF PREFERRED EMBODIMENTS

1. Embodiments Relating to Polarization and Limiting Current Density 1.1 As noted above, when the limiting current density during electrodialysis (as measured by the Cowan-Brown method (Ind. Eng. Chem. 51, 1445 (1959)) of conventional cation exchange membranes is exceeded there is very little "splitting" of water into hydrogen and hydroxide ions. However when the Cowan-Brown limiting current density of conventional anion exchange membranes is approached or exceeded a substantial fraction of the impressed direct current is carried by hydrogen and hydroxide ions apparently resulting from the splitting of water by the high potential gradients which exist at the interfaces between the anion exchange membranes and the liquid in the diluting compartment near and above the Cowan-Brown limiting current density. (The limiting current density for anion exchange membranes is roughly 50% greater than that for cation exchange membranes). Water splitting at polarized anion exchange membranes (that is at such membranes operating near or above the Cowan-Brown limiting current density) results in hydrogen ions passing into the liquid in the diluting compartments of an ED, EDR, EDI or EDIR stack and hydroxide ions passing into the liquid in the concentrating compartments. Since many liquids which it is desired to demineralize contain calcium and bicarbonate ions (e.g. potable water and brackish water) the passage of hydroxide ions into the concentrating compartments can result in precipitates of calcium carbonate on and/or in those surfaces of conventional anion exchange membranes which surfaces are in contact with the concentrating streams.

During the last few years it has been shown that the above difference in behavior between conventional anion exchange membranes and conventional cation exchange membranes is apparently due to the presence of weakly basic amines (i.e. primary, secondary and/or tertiary amines) bound to the polymer at those surfaces of the anion exchange membranes which are in contact with the solution in the diluting compartments. If the anion exchange membranes contain only quaternary ammonium groups (and essentially no weakly basic amines) it is found that the amount of water splitting near or above the Cowan-Brown limiting current is about the same as for conventional (sulfonate type) cation exchange membranes. (Such results are obtained with water free from medium and high molecular weight organic anions such as are commonly found in natural water and many other solutions). However after a day or so of operation near or above the limiting current density it is found with commercial anion exchange membranes that water splitting increases significantly rapidly reaching the equivalent of several percent of electric current. It is then found that the anion exchange membranes contain weakly basic amines, apparently due to decomposition of quaternary ammonium exchange groups by the high potential gradients existing at the interfaces between anion exchange membranes and the solutions in the diluting compartments during polarization. It has also been found that anion exchange membranes based on crown ethers (chelated with divalent cations) also split water only to about the same extent as conventional ED cation exchange membranes (if the water is free from medium and high molecular weight organic anions). In this case the membranes contain no quaternary ammonium groups and no weakly basic amines. Continued operation near or above the limiting current does not result in increasing water splitting. Such crown-ether membranes are however commercially impractical.

It is now disclosed that anion exchange membranes, which have at least in those surfaces which contact the liquid in the diluting compartments only certain quaternary ammonium (also called "nitronium" or "quaternary nitronium") and/or certain quaternary phosphonium groups, exhibit reduced water splitting during extended operation with clean water at currents near or above the Cowan-Brown limiting current. Such certain quaternary ammonium or phosphonium groups are characterized by decomposing almost solely into free (that is mobile, not bound) low molecular weight amines and/or phosphines and moieties bound to the membrane which moieties are neither weak bases or weak acids, that is into moieties which do not have acid or base dissociation constants in the range of from about $10^{-3}$ to about $10^{-11}$ at room temperature. Examples of such membranes are those which contain, in at least those surfaces which contact the liquid in the diluting compartments only poly N-(vinyl benzyl)pyridinium, poly N-(vinyl benzyl)-N, N,N-triphenyl ammonium and/or poly P-(vinyl benzyl)-P,P, P-triphenyl phosphonium exchange groups. Such groups are characterized by decomposing under attack by Lewis bases (such as hydroxide ion) into low molecular weight, mobile pyridine, triphenyl amine and/or triphenyl phosphine moieties and bound polyvinyl benzyl alcohol. The acid or base dissociation constant of the later is outside the range of from about $10^{-3}$ to about $10^{-11}$ at room temperature. The mobile decomposition products (e.g. pyridine, triphenyl amine and/or triphenyl phosphine) diffuse out of the membrane and/or are carried out by electro-osmosis. Such membranes may be prepared for example:

(a) by reacting divinyl benzene-styrene copolymer gel sheets with chloromethyl ether and a Friedel-Crafts catalyst to introduce chloromethyl groups and then treating such chloromethylated gel sheets at least briefly and on at least those surfaces which will contact liquid in the diluting compartments of an ED, EDR, EDI or EDIR stack with pyridine, triphenyl amine and/or triphenyl phosphine in solution. The remaining chloromethyl groups in the sheets may be reacted with the same amines or phosphine (by total and extended exposure to such amines or phosphine) or with other amines or phosphines (preferably tertiary amines and/or phosphines, less preferably mixtures of tertiary amines and/or phosphines with primary and/or secondary amines and/or phosphines;

(b) by reacting a divinyl benzene-vinyl benzyl chloride copolymer gel sheet with pyridine, triphenyl amine and/or triphenyl phosphine as discussed above; or (c) by reacting vinyl benzyl chloride (also called "chloromethyl styrene") with pyridine, triphenyl amine and/or triphenyl phosphine and then copolymerizing the resulting vinyl benzyl ammonium and/or vinyl benzyl phosphonium monomer with a crosslinking agent such as divinyl benzene.

Equivalents of divinyl benzene-styrene copolymer gel sheets; divinyl benzene-vinyl benzyl chloride gel sheets; and vinyl benzyl chloride are well-known in the art. Equivalents to pyridine, triphenyl amine and triphenyl phosphine for the purpose discussed above will be obvious to those skilled in the art and include picoline, lutidine, ethyl pyridine, pyridazine, pyrimidine, pyrazine, quinoline, isoquinoline, cinnoline, quinazoline and quinoxaline.

In contrast to the above quaternary ammonium and/or quaternary phosphonium exchange groups, it is believed that polyvinyl benzyl trimethyl ammonium groups (a typical group in commercial anion exchange membranes) when attacked by Lewis bases (such as hydroxide ion) result in both trimethyl amine and methyl alcohol as free, mobile low molecular weight decomposition products and polyvinyl benzyl dimethyl amine and polyvinyl benzyl alcohol as bound products. It is also believed that polyvinyl benzyl trialkyl ammonium groups (where the alkyl groups have two or more carbon atoms), in addition to attack by Lewis bases are also subject to solvolytic attack resulting in an olefin as free, mobile, low molecular weight decomposition product and polyvinyl benzyl dialkyl amine as bound product. For example polyvinyl benzyl triethyl ammonium by such solvolytic attack gives ethylene and polyvinyl benzyl diethyl amine.

1.2 For some applications of filled cell ED ("EDI") or filled cell EDR ("EDIR") it is desirable to utilize anion exchange granules which have diminished water splitting in clean water. The chemistries discussed above may readily be used by those skilled in the art to make such granules.

1.3 It was mentioned above that when anion exchange membranes which do not contain weakly basic amines are operated on clean water near or above the Cowan-Brown limiting current for such membranes then the amount of water splitting found will be similar to that found with conventional (sulfonate type) cation exchange membranes near or above the limiting current for the latter membranes. However natural water (including drinking water) generally contains moderate or high molecular weight organic anions (e.g. humic and tannic acids) and/or negatively charged colloidal oxides or hydroxides (i.e. insoluble inorganic weak acids) which organic anions and/or colloids may accumulate on those surfaces of anion exchange membranes which contact liquid in the diluting compartments of electrodialysis apparatus. Such accumulated organic anions and colloids can result in significant water splitting even with the above disclosed reduced water splitting anion exchange membranes. The organic anions and/or colloids may be removed from water by filtration, sorption (e.g. by sterile activated carbon or scavenging type anion exchange resin granules such as Amberlite IRA 900, 904, 910, 938 or 958), dead-end or cross-flow microfiltration, ultra filtration, nanofiltration and/or reverse osmosis. ("Amberlite" is a trade mark of Rohm and Haas Co., Philadelphia, Pa., U.S.A.). Such processes may be highly effective in removing organic anions and colloids. However they do add to the cost of water treatment, are sometimes not completely effective and are subject to upsets in effectiveness. It would be desirable therefore to have cation exchange membranes which split water near or above their limiting current densities. (As mentioned above the limiting current density for a cation exchange membrane is generally substantially less than that of an anion exchange membrane). It is now disclosed that cation exchange membranes which have in at least those surfaces which contact the liquid in the diluting compartments of an ED, EDR, EDI or EDIR apparatus a predominant amount of strongly acid cation exchange groups (e.g. sulfonic acid groups) and a comparatively minor amount of weakly acid and/or weakly basic groups exhibit water splitting at currents near or above their Cowan-Brown limiting currents roughly similar to the water splitting exhibited by conventional anion exchange membranes near or above the limiting currents of the latter. It has been found that the most preferred weakly acid and/or weakly basic groups have dissociation constants of about $10^{-7}$. However groups having dissociation constants in the range of from about $10^{-3}$ to $10^{-11}$ have at least some ability to split water near or above the limiting current. A predominant concentration of strongly acid groups is desired to assure high ionic conductivity and high permselectivity (that is exclusion of low molecular weight negatively charged ions). (A high concentration of strongly acid groups expressed on the volume of the membrane as a whole is generally desired for high ionic conductivity whereas a high concentration of such groups expressed on the weight of water in the membrane is generally desired for high permselectivity). For a given concentration of weakly acid and/or weakly basic groups in the dilute surface regions of the membranes and a given dissociation constant of such groups there is, apparently a limited rate at which water can be split as the current is increased above the limiting current. Thus for a given desired amount of water splitting at currents near or above the limiting current a lower concentration of weakly acid and/or weakly basic groups is required if such groups have dissociation constants of $10^{-7}$ as compared for example to $10^{-3}$ or $10^{-11}$. Commercial cation exchange membranes tend to be based on sulfonated divinyl benzene-styrene copolymer gel sheets; on crosslinked polysulfoethyl meth-acrylate gel sheets; on crosslinked polyacrylamido methyl propyl sulfonic acid gel sheets; and/or on crosslinked polystyrene sulfonate gel sheets. In such case suitable weakly acid or weakly basic groups may be incorporated utilizing commercially available vinyl and related monomers such as acrylic acid (pK about 4.3), itaconic acid, crotonic acid (pK about 4.7), methacrylic acid (pK about 5.7), tertiary butyl amino ethyl methacrylate, dimethyl aminoethyl methacrylate, diethylaminoethyl methacrylate, vinyl pyridine, methyl vinyl pyridine, dimethyl amino ethyl acrylate, dimethyl amino ethyl methacrylamide, dimethyl amino neopentyl acrylate, dimethyl amino propyl methacrylamide, dimethyl amino styrene, aminoethyl methacrylate, amino propyl methacrylamide, aminostyrene (i.e. vinyl aniline), sodium acrylate, sodium methacrylate, vinyl acetic acid, vinyl benzoic acid and vinyl benzyl amine. Generally from about 5 to about 30 equivalent percent of weakly acid and/or weakly basic groups will be sufficient (and therefore 70 to 95 equivalent percent sulfonate groups) at least in those surfaces which will be exposed to the dilute compartments.

In use at current densities in electrodialysis near or above the limiting current of conventional anion exchange membranes the above water splitting cation exchange membranes inject substantial quantities of hydrogen ions into the concentrate compartments of the ED, EDR, EDI or EDIR stack thereby significantly reducing the pH of the liquid in such compartments (and simultaneously significantly increasing the pH in the diluting compartments).

1.4 In the case of filled cell electrodialysis operating in the highly polarized mode and in which the dilute compartments are packed with roughly equal equivalents of anion exchange and cation exchange granules, the required water splitting occurs at bipolar junctions in which the anion exchange resin (granule or membrane) is roughly on the anode side of the junction (and obviously the cation exchange resin, granule or membrane, is roughly on the cathode side of the junction). The potential losses found in filled cell electrodialysis appear to indicate that there is only about 1 water splitting bipolar junction in each current path. (The potential loss at each such junction is about 0.8 volts). It also appears that much of the water splitting is occurring at junctions between conventional anion exchange membranes and conventional cation exchange granules. The performance of ED or filled cell ED can be "tailor-made" to suit the application by judicious choice among:

conventional water splitting anion exchange membranes;
reduced water splitting anion exchange membranes according to this invention;
conventional, low water splitting cation exchange membranes;
enhanced water splitting cation exchange membranes according to this invention;
conventional water splitting anion exchange granules;
reduced water splitting anion exchange granules according to this invention;
conventional low water splitting cation exchange granules;
enhanced water splitting cation exchange granules made in accordance with the chemistries discussed above.

2. Embodiments Relating to Selective Removal of Monovalent Ions Compared to Divalent Ions of the Same Charge Sign 2.1 Both anion exchange and cation exchange membranes which are selective to monovalent ions compared to divalent ions have been used for many years to produce 18 to 20% impure salt brine from sea water. (Such membranes include ASV anion exchange membranes, Asahi Glass Co., Tokyo, Japan; A-102 anion exchange membranes and K-172 cation exchange membranes, Asahi Chemical Industries, Tokyo, Japan; ACS anion exchange membranes and CMS cation exchange membranes, Tokuyama Corp., Tokyo, Japan). It has been shown (e.g. U.S. Pat. No. 5,094,732) that these membranes are also selective to monovalent ions compared to divalent ions of the same charge sign in water of less than 1000 ppm total dissolved solids if the direct electric current used is a fraction (e.g. ½ or less) of the Cowan-Brown limiting current for the membrane. For example treating a water having total dissolved solids of about 638 ppm, the current density used was only 18 amperes per square meter of effective area (based on the one-sided surface area of one membrane), about 22.5% of the limiting current. Such current densities are very impractical. (It is well-known that in the vicinity of the limiting current the selectivity of a membrane among different ions of the same charge sign, is determined by the ratio of their limiting currents. For example the ratio of the limiting currents of the calcium salts of chloride and sulfate at the same equivalent concentration is about 1.4).

As noted above the problem of low limiting currents in electro-dialysis was first addressed by Walters et al. (Ind. Eng. Chem. 47, 61 (1955)) who filled the dilute cells of an ED apparatus with a mixture of anion exchange granules and cation exchange granules. As is now well known, such filled cell ED has a much higher limiting current density expressed on the membrane area than conventional ED.

It is also well-known that standard ion exchange granules in dilute solution are selective to divalent ions as compared to monovalent ions of the same charge sign. Hence commercial, filled cell ED apparatus (EDI apparatus) operating at current densities which are less than the limiting current densities for such apparatus selectively remove divalent ions. If, for example the water processed contains calcium and sulfate ions then at high recoveries of demineralized water the ion product $(Ca^{++}) \cdot (SO_4^=)$ (where $Ca^{++}$) and $(SO_4^=)$ represent the concentration of the ions in grams mols per liter) can easily exceed the solubility product of such ions leading to precipitation of poorly soluble calcium sulfate in the concentrate compartments, generally on and/or in the surface of one or the other of the membranes.

Electrodialysis apparatus and processes are now disclosed in which at least the diluting compartments of an electrodialysis stack are packed with (filled with) ion exchange granules which granules comprise in whole or in part granules which are selective to monovalent ions as compared to divalent ions of the same charge sign during electrodialysis at current densities which are substantially less than the limiting current density of such filled diluting compartments. The packing (filling) may consist for example of:

only monovalent anion selective granules;
a mixture of monovalent anion selective granules and (conventional) divalent cation selective granules;
a mixture of monovalent anion selective granules and monovalent cation selective granules;
a mixture of (conventional) divalent anion selective granules and monovalent cation selective granules; or
only monovalent cation selective granules.

It is also disclosed that such monovalent ion selective granules are preferably prepared by altering the surface properties of conventional ion exchange granules using methods adapted from the procedures used to make monovalent ion selective membranes (for example U.S. Pat. Nos. 3,510,417; 3,510,418; 3,647,086; 3,847,772; 3,868,314; and 4,923,611). Such procedures include sorbing on and/or bonding to the surfaces of such granules medium molecular weight organic ions or polyions having fixed charges opposite to the fixed charges in the ion exchange granules and/or destroying the ion exchange groups in the surfaces of such granules.

Monovalent anion exchange granules may also be prepared by incorporating certain quaternary ammonium and/or quaternary phosphonium groups at least in the surface regions of such granules. Preferred groups are:

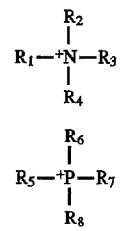

where $R_1$ and $R_5$ represent the polymer backbone of the anion exchange granules or a "tether" (e.g. a benzyl, phenyl or alkyl group) to such backbone; $R_2$, $R_3$, $R_4$, $R_6$, $R_7$ and $R_8$ represent alkyl, aryl, alkyl aryl or aryl alkyl groups having at least two carbon atoms. $R_2$, $R_3$, $R_4$, $R_6$, $R_7$ and $R_8$ are preferably butyl or phenyl groups less preferably ethyl, propyl or amyl groups. Sufficient monovalent anion selectivity in dilute solutions seems not be achieved when $R_2$, $R_3$, $R_4$, $R_6$, $R_7$, and/or $R_8$ are methyl or ethanol(hydroxyethyl) i.e. when the groups

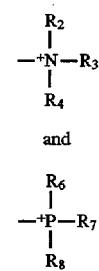

are for example trimethyl ammonium, methyl diethanol ammonium (that is, di(hydroxyethyl)methyl ammonium), ethyl diethanol ammonium, triethanol ammonium, dimethyl ethanol ammonium, diethyl ethanol ammonium and trimethyl phosphonium. Any two or three of $R_1$, $R_2$, $R_3$, and $R_4$ on the one hand and $R_5$, $R_6$, $R_7$ and $R_8$ on the other may be members of the same heterocyclic ring structure containing the N or the P of the above formulas.

In the above formulas $R_1$ and $R_5$ may be for example an acryloxyethyl, methacryloxy ethyl, 2-hydroxy-3-methacryloxy propyl, acrylamido propyl, methacrylamido propyl, acrylamido neopentyl, methacrylamido ethyl, vinyl benzyl, methyl vinyl benzyl, ethyl vinyl benzyl, vinylphenethyl, vinyl phenyl and/or vinyl menaphthyl residue polymerized as part of the polymer backbone of the anion exchange granules.

The anion exchange granules of which at least the surface regions contain a predominant amount of quaternary ammonium and/or quaternary phosphonium groups each substituent of which is an alkyl, aryl, alkylaryl or aryl alkyl group (other than ethanol) containing at least two carbon atoms may be prepared for example from conventional granular precursors containing active halogen e.g. chloromethylated divinyl benzene-styrene copolymer granules. The swelling of such beads in swelling liquids and the swelling in water of such beads which have been reacted with trimethyl amine is conventionally controlled by varying the quantity of divinyl benzene or other crosslinking monomer used in preparation of the granules, the less crosslinking monomer the more swelling. In order to allow access into the chloromethylated beads of the bulky amines and phosphines required to make the above type of monovalent anion selective granules it is necessary to use low amounts of crosslinking monomer. The resulting quaternized granules then tend to be fragile. It is preferred therefore to make such monovalent anion exchange granules from:

a mixture of non-polymerizable diluent and monomers having a relatively high proportion of crosslinking monomer; or a mixture of crosslinking monomer and polymerizable monomers already containing the desired quaternary ammonium or phosphonium moieties.

When the polymerizable monomers have a relatively high proportion of crosslinking monomers then the water content of the final anion exchange granules is primarily determined by the amount of the above mentioned non-polymerizable diluent in the polymerizable mixture.

Examples (without limitation) of polymerizable monomers already containing the desired quaternary ammonium and/or phosphonium moieties include:

N-(methacrylamido propyl)-N,N,N-trialkyl ammonium or phosphonium halides;

N-(methacrylamido ethyl)-N,N,N-trialkyl ammonium or phosphonium halides;

N-(methacryloxy ethyl)-N,N,N-trialkyl ammonium or phosphonium halides.

N-(vinyl benzyl)-N,N,N-trialkyl ammonium or phosphonium halides; and

N-(vinyl benzyl)-N,N,N-triphenyl ammonium or phosphonium halides;

where in each case "alkyl" is ethyl, propyl, butyl or amyl. Those skilled in the art will immediately recognize many equivalents of the above examples.

2.2 ED and/or EDR stacks in which at least the dilute compartments are packed with a mixture of monovalent anion selective granules and (conventional) divalent cation selective granules are useful for softening potable or brackish water, for example as part of a home water system. Since the concentrate stream will contain predominantly calcium and magnesium salts of chloride and nitrate the percentage of water which is recovered as softened water can be very high without risk of precipitation of poorly soluble calcium and magnesium salts. Such stacks will be operated at current densities which are substantially less than the limiting current density. The stacks can also form the first stage of a two stage filled cell electrodialysis demineralization apparatus, the softened product of such first stage constituting the feed to the second stage. The dilute compartments of such second stage EDI may be filled for example with a mixture of (conventional) divalent anion selective granules and (conventional) divalent cation selective granules or with a mixture of (conventional) divalent anion selective granules and monovalent cation selective granules. Since the concentrated stream in such second stage will contain predominantly sodium and potassium salts of sulfate and bicarbonate the percentage of water which is recovered as demineralized water from such second stage can also be very high without risk of precipitation of poorly soluble salts. Such second stage will often be operated in a highly polarized mode, in which case it may not be useful to use monovalent cation selective granules and may instead be useful to use cation exchange granules and membranes which exhibit enhanced water splitting near and above their limiting current density.

The above mentioned ED and/or EDR stacks in which at least the dilute compartments are packed in whole or in part with monovalent anion selective granules are also efficient for the removal of nitrate and nitrite from potable or brackish water when operating at currents substantially less than the limiting current for such packed compartments. (It is usually found that nitrate is removed about twice as rapidly as chloride). If the packed compartments also comprise monovalent cation selective granules then the concentrate stream can comprise predominantly sodium and potassium salts of chloride and nitrate and can be concentrated to very high levels i.e. the recovery of denitrified water can be extremely high.

2.3 ED and/or EDR stacks in which at least the dilute compartments are packed with a mixture of (conventional) divalent anion selective granules and monovalent cation selective granules are also useful as the first stage of a two stage filled cell electrodialysis demineralization apparatus. The concentrate stream will contain predominantly monovalent cation salts of divalent anions and therefore the concentrate stream, can be concentrated to very high levels. The product of the dilute compartments of such first stage will be a suitable feed for a second stage operating at very high recoveries. The dilute compartments of such second stage EDI may be filled for example with a mixture of (conventional) divalent cation selective granules and (conventional) divalent anion selective granules or with a mixture of monovalent anion selective granules and (conventional) divalent cation selective granules. Since the concentrated stream in such second stage will contain predominantly calcium and magnesium salts of chloride and nitrate the percentage of demineralized water which can be recovered from such second stage can be very high.

2.4 Although ED and/or EDR stacks in which at least the dilute compartments are packed in whole or in part with monovalent selective ion exchange granules can be operated satisfactorily with divalent ion selective membranes it is advantageous and preferred to use monovalent ion selective anion exchange membranes whenever monovalent anion selective granules are used and monovalent cation exchange membranes whenever monovalent cation selective granules are used.

3. Embodiments Relating to Short Diffusion Path Ion Exchange Granules

Ion exchange granules functionalized deeply but not completely and to a constant depth have been disclosed for chemically regenerated ion exchange processes (W. Fries, Reactive Polymers (1993), Elsevier Science Publishers, Amsterdam). It is now disclosed that such shell/core granules are quite useful in filled cell ED and/or EDR apparatus and/or processes. In the case of conventional ion exchange granules in filled cell use, the electric current is apparently carried substantially throughout each granule. It is often desirable to limit the current to a shell of ion exchange resin in the granule. For example when filled cell ED or EDR is operated in the highly polarized mode much of the current passing through the anion exchange granules is carried by hydroxide ions passing through the core region and much of the current through the cation exchange granules by hydrogen ions passing through the core regions. Owing to diffusion limitations in the shell such core currents may constitute an inefficiency.

In accordance with other aspects of this invention the shell of such short diffusion path granules may comprise monovalent ion selective ion exchange resin, enhanced water splitting cation exchange resin or diminished water splitting anion exchange resin. Alternatively such functions may be limited to a thin skin on the external surface of such shells.

4. Embodiments Relating to Processes Utilizing the Apparatus Aspects of this Invention The use of the apparatus aspects of this invention for softening, de-nitrifying or demineralizing water have been disclosed above in the discussion of apparatus embodiments. In addition it has been found that the disclosed apparatus is useful for deashing clarified, liquid, milk products and for removing chloride from solutions of chlorine in water thereby, for example, efficiently producing hypochlorous acid substantially free from hydrochloric acid.

4.1 It is desirable to deash liquid, milk products substantially. Both conventional electrodialysis (including reversing type electrodialysis) and chemically regenerated ion exchange have been used for this purpose. As noted above it is difficult to remove more than about 60 percent of the ash from many liquid, milk products. Chemically regenerated ion exchange readily removes 90 percent or more of such ash but suffers from the need for frequent chemical regeneration. The latter however cleans and sanitizes the ion exchange granules.

It is herein now disclosed that filled cell ED or filled cell EDR can advantageously replace chemically regenerated ion exchange for the deep deashing of liquid, milk products. The feasibility of filled cell ED or filled cell EDR for such use is completely contraindicated by the literature on deionization by filled cell ED or filled cell EDR. Such literature is replete with the need to remove all colloids from water before processing by such filled cell apparatus. Totally unexpectedly it has been found that even liquid, milk products containing 25 percent solids can be conveniently processed by filled cell ED or filled cell EDR. Applicants do not have an explanation for such finding.

Filled cell ED and/or filled cell EDR advantageously utilize various apparatus aspects of this invention for deashing liquid, milk products. Thus it is advantageous to utilize monovalent anion exchange granules and membranes in a first stage of filled cell electrodialysis in order to minimize the volume of the waste concentrate stream and yet avoid precipitation in the latter. It is also advantageous to utilize short diffusion path ion exchange granules and enhanced water splitting cation exchange membranes, the latter to reduce the amount of acid required to control the pH of the concentrate stream.

4.2 Bleach, including household bleach, is conventionally prepared by the reaction:

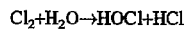

The above is an equilibrium reaction and the presence of NaCl tends to push the reaction to the left. Further the presence of NaCl constitutes an extra burden on the environment. In contrast the reaction of hypochlorous acid and caustic is as follows:

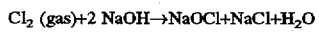

The latter reaction utilizes half as much caustic and does not produce sodium chloride. The reaction is not pushed to the left. Hypochlorous acid is in equilibrium with chlorine water

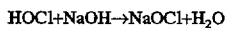

This reaction may be pushed to the right by removing the HCl. However the limited solubility of chlorine in water means for example that at 20° C. and one atmosphere of chlorine gas pressure the concentration of HCl is only about 1 gram per liter. High removals of HCl are therefore difficult by conventional ED or EDR. It is now disclosed that such HCl can be conveniently removed by filled cell ED. Water splitting is undesirable since any hydroxide passing through the anion exchange membranes constitutes current inefficiency. Therefore reduced water splitting anion exchange granules and membranes are advantageous.

EXAMPLE 1

Preparation of Polarizable CX Membranes (a) An apparatus according to U.S. Pat. No. 5,056,996 is used. The substrate is a 20 inch wide fabric woven from polypropylene staple fiber. A solution is prepared from about:

| | |
|---|---|
| ethylene glycol dimethacrylate: | 168 pounds |
| 1-methyl-2-pyrrolidinone | 340 pounds |
| 80% divinyl benzene of commerce | 147 pounds |
| 2-sulfoethyl methacrylate | 321 pounds |
| glacial acrylic acid | 30 pounds |
| 2,2'-azobis(2-methyl butyronitrile) | 10 pounds |

The resulting solution is thoroughly deoxygenated. The linear velocity of the apparatus is adjusted to give a polymerization time of about 25 minutes. The solution impregnated fabric is sandwiched between films of Mylar™ type M (duPont Co., Wilmington, Del., U.S.A.). In the polymerization zone the temperature of the sandwich is increased from about 70° C. at the beginning of the zone to about 100° C. at the end of the zone. After polymerization the Mylar film is stripped from the continuous sheet of membrane which is then cut into lengths of about 40 inches each. The resulting sheets are leached in a dilute aqueous sodium bicarbonate solution to remove the 1-methyl-2-pyrrolidinone and convert the membrane to the sodium form.

(b) The apparatus of Ex. 1(a) according to U.S. Pat. No. 5,056,996 is used. The substrate is a 20 inch wide fabric woven from acrylic staple fiber. A solution is prepared from about:

| | |
|---|---|
| 2-methyl-2-[(1-oxo-2-propenyl)amino]-1-propane sulfonic acid | 48.7 Kg |
| paramethoxy phenol | 11.8 grams |
| 1-methyl-2-pyrrolidinone | 61.3 liters |
| demineralized water | 6.1 liters |
| ethylene glycol dimethacrylate | 55.4 liters |
| methacrylic acid | 5.1 Kg |
| benzoyl peroxide | 1.78 Kg |
| 1,1'-azo bis(cyano cyclohexane) | 0.90 Kg |

The resulting solution is thoroughly deoxygenated. The linear velocity of the apparatus is adjusted to give a polymerization time of about 25 minutes. The fabric impregnated with solution is sandwiched between films of Mylar type M (as in Ex. 1(a)). In the polymerization zone the temperature of the sandwich is increased from about 70° C. at the beginning of the zone to about 100° C. at the end of the zone. After polymerization the Mylar film is stripped from the continuous sheet of membrane which is then cut into lengths of about 40 inches. The resulting sheets are leached in dilute aqueous sodium bicarbonate solution to remove the 1-methyl-2-pyrrolidinone and convert the membrane to the sodium form.

(c) The apparatus of Ex 1.(a) according to U.S. Pat. No. 5,056,996 is used. The substrate is a 20 inch wide fabric woven from acrylic staple fiber. A solution is prepared containing about:

| benzyl trimethyl ammonium styrene sulfonate | 56.1 Kg |
|---|---|
| divinyl benzene (80% of commerce) | 20 Kg |
| 1-methyl-2-pyrrolidinone | 50 Kg |
| demineralized water | 5.6 Kg |
| 2-methyl-5-vinyl pyridine | 3.5 Kg |
| 2-azo-bis(isobutyronitrile) | 0.5 Kg |

The resulting solution is thoroughly deoxygenated. The linear velocity of the apparatus is adjusted to give a polymerization time of about 25 minutes. The fabric impregnated with solution is sandwiched between films of Mylar type M (as in Ex. 1(a)). In the polymerization zone the temperature of the sandwich is increased from about 70° C. at the beginning of the zone to about 100° C. at the end of the zone. After polymerization the Mylar film is stripped from the continuous sheet of membrane which is then cut into lengths of about 40 inches. The resulting sheets are leached in a dilute aqueous solution of sodium bicarbonate or salt to remove the 1-methyl-2-pyrrolidinone and quaternary ammonium ion and convert the membrane to the sodium form (d) (Comparative) The procedure of part (a) is repeated except the polymerizable, impregnating solution has a composition of about:

| ethylene glycol dimethacrylate | 168 pounds |
|---|---|
| 1-methyl-2-pyrrolidinone | 359 pounds |
| divinyl benzene (80% of commerce) | 147 pounds |
| 2-sulfoethyl methacrylate | 401 pounds |
| 2,2'-azobis(2-methyl butyronitrile) | 10.1 pounds |

(e) (Comparative) The procedure of Ex. 1(b) is repeated except the polymerizable, impregnating solution has a composition of about:

| 2-methyl-2-[(1-oxo-2-propenyl)amino]-1-propane sulfonic acid | 60.9 Kg |
|---|---|
| paramethoxy phenol | 12.3 grams |
| 1-methyl-2-pyrrolidinone | 6.4 liters |
| demineralized water | 6.4 liters |
| ethylene glycol dimethacrylate | 55.4 liters |
| benzoyl peroxide | 1.86 Kg |
| 1,1' azobis(cyanocyclohexane) | 0.94 Kg |

(f) (Comparative) The procedure of Ex. 1(c) is repeated except the polymerizable, impregnating solution has a composition of about:

| benzyl trimethyl ammonium styrene sulfonate | 66 Kg |
|---|---|
| divinyl benzene (80% of commerce) | 20 Kg |
| 1-methyl-2-pyrrolidinone | 54 Kg |
| demineralized water | 6 Kg |

-continued

| 2-azo-bis(isobutyronitrile) | 0.5 Kg |
|---|---|

EXAMPLE 2

Preparation of Monovalent Anion Selective, Ion Exchange ("IX") Granules (a) About 3 liters of demineralized water are placed in a closed, stirred reactor. The water is deaerated with oxygen free nitrogen. About 6 grams of carboxy methyl methyl cellulose (CMMC) are dispersed in the water. About 500 ml of deaerated diethyl benzene and about 5 grams of 50% methylethyl ketone peroxide in dimethyl phthalate are added with stirring at a rate determined to give droplets of the desired size, preferably about 0.5 min. A mixture is prepared containing about 330 ml of vinyl benzyl chloride, about 170 ml of divinyl benzene (76% of commerce) and about 0.5 grams cobalt 2-ethyl hexanoate. The latter mixture is deaerated and added to the stirred reactor which is then warmed to about 30° C. Stirring is continued until the polymerization is essentially complete. The resulting granules are filtered out of the suspension, dried by sucking air through them while mixing from time to time. The dry granules, still swollen by diethyl benzene, are screened retaining the fraction which passes through a U.S. Standard Sieve No. 30 but is retained by Sieve No. 40. The retained fraction is rinsed with methanol to remove and replace the diethyl benzene and any low molecular weight polymers and unreacted monomers. The granules are gel type.

(b) A solution is prepared containing per liter about:

| divinyl benzene (56% of commerce) | 388 ml |
|---|---|
| styrene | 136 ml |
| diethyl benzene | 475 ml |
| benzoyl peroxide | 2.2 grams |

One liter of the solution is added to a closed, stirred reactor containing 3 liters of demineralized water and 6 grams of carboxy methyl methyl cellulose (CMMC). Stirring is adjusted to give droplets of the desired size, preferably about 0.5 min. The suspension is thoroughly deaerated with oxygen free nitrogen and then heated to 80° C. (with stirring sufficient to maintain the droplet size). When the polymerization is essentially complete, the reactor is cooled to room temperature and the granules which have resulted are recovered by filtration, dried by sucking air through them while mixing from time to time. The dry granules, still swollen by diethyl benzene, are screened, retaining the fraction which passes through a No. 30 U.S. Standard sieve but is retained by a No. 40 sieve. The retained fraction is rinsed with methylene chloride to remove and replace the diethyl benzene and any low molecular weight polymers and unreacted monomers. The resulting granules are placed in a closed reactor and about three times their volume of monochloromethyl methyl ether containing about 10% by weight of anhydrous ferric chloride is added to the reactor. The contents of the closed reactor are stirred gently. After several hours (e.g. overnight) the granules and remaining ether are separated and the granules rinsed with methylene dichloride and then with methanol. (Mono chloromethyl methyl ether may contain bis (chloromethyl) ether, a recognized pulmonary carcinogen. All the above procedures are therefore carried out under conditions which prevent escape into the environment of vapors of monochloromethyl methyl ether. Waste monochloromethyl methyl ether is promptly destroyed by methods well known in the art). The granules are gel type.

(c) Example 2(b) is repeated except the chloromethylation reaction is stopped (by quenching with methanol) when the reaction has proceeded to about half the radius of the beads. The correct time is determined by tests on small batches of beads which are quenched with methanol and then reacted with a solution of trimethyl amine in methanol. A few beads from each test batch are split, dyed with an anionic dye and observed under a microscope for depth of penetration. The granules are gel type.

(d) Beads according to Examples 2(a), (b) and (c) are reacted with about a five fold excess of the following amines and phosphines individually in methanol solution:

trimethyl amine
triethyl amine
tributyl amine
trimethyl phosphine
tripropyl phosphine
tributyl phosphine.

The quaternization reaction is allowed to proceed at room temperature for about a week, after which the beads are recovered, rinsed with methanol and then with water. The granules are gel type.

(e) Beads according to Examples 2(a), (b) and (c) are dried and a thin layer then irradiated with ultraviolet light for several hours (with frequent mixing of the layer) in order to destroy chloromethyl groups on the surfaces of the beads. The beads are then reacted with a 5-fold excess of trimethyl amine in methanol. The correct intensity and duration of such irradiation is determined by preliminary tests in which small samples of irradiated beads are rinsed with methanol, then reacted at 30° C. for several hours with about a five fold excess of trimethyl amine in methanol stirring from time to time. The thus quaternized sample is rinsed with water and a few beads from each sample are split, dyed with an anionic dye and the split surface observed under a microscope. The preferred depth of destruction is in the range of from about 1 to about 2 micrometers.

Alternatively the correct intensity and duration of the irradiation is determined by preliminary tests in which irradiated beads are rinsed with methanol, then reacted at 30° C. for several hours with about a five fold excess of trimethyl amine in methanol, stirring from time to time. The thus quaternized sample is rinsed with water and tested for monovalent/divalent anion selectivity at low approaches to polarization according to Examples 9, 10 or 11 below.

(f) Beads prepared in accordance with Examples 2(a), (b) and (c) are reacted with about a five fold excess of trimethyl amine in methanol at 30° C. for several hours. The beads are recovered, rinsed with water and then stirred in about 5 times their volume of a solution containing about 1% low molecular weight sodium polystyrene sulfonate for 3 hours. The beads are recovered by filtering through a screen.

EXAMPLE 3

Preparation of Monovalent Cation Selective, Ion Exchange Granules (a) Amberlite IR 120 gel type beads (Rohm and Haas Co., Philadelphis, Pa.) having a mean diameter of about 0.05 cm are stirred in about 5 times their volume of a solution containing about 1% low molecular weight polyvinyl pyridine for 3 hours. The beads are recovered by filtering through a screen.

(b) Amberlite IR 120 gel type beads having a mean diameter of about 0.05 cm are stirred in about 5 times their volume of a solution containing about 1% low molecular weight polyethylenimine for 3 hours. The beads are recovered by filtering through a screen.

(c) Beads prepared according to Examples 2(a), (b) and (c) are dried and a thin layer then irradiated with ultraviolet light for several hours as described in Example 2(e) to destroy chloromethyl groups on the surfaces of the beads. The resulting beads are then reacted with a 5 fold excess of dimethyl sulfide in methanol to introduce sulfonium groups and subsequently with aqueous sodium bisulfite to replace the sulfonium groups with sulfonic acid groups.

EXAMPLE 4

Preparation of AX Membranes Which Have Low Water Splitting in Clean Water (a) Comparative An apparatus according to U.S. Pat. No. 5,056,996 is used. The substrate is a 20 inch wide fabric woven from acrylic staple fiber. About 150 Kg of solution are prepared containing about:

| | |
|---|---|
| vinyl benzyl trimethyl ammonium chloride | 66.5 Kg |
| divinyl benzene (76% of commerce) | 15.4 Kg |
| 1,2-propylene glycol | 67.3 Kg |
| 2-azo-bis-isobutyronitrile | 0.5 Kg |

The solution is thoroughly deoxygenated. The linear velocity of the apparatus is adjusted to give a polymerization time of about 25 minutes. The solution-impregnated fabric is sandwiched between films of Mylar™ type M. In the polymerization zone the temperature of the sandwich is increased from about 70° C. at the beginning of the zone to about 100° C. at the end of the zone. After polymerization the Mylar film is stripped from the continuous sheet of membrane which is then cut into lengths of about 40 inches each. The resulting sheets are leached in water to remove the propylene glycol.

An electrodialysis apparatus is assembled using the above anion exchange membranes and CR61AZL cation exchange membranes available from Ionics, Incorporated, Watertown, Mass. 02172, U.S.A. An aqueous solution of about 0.05N sodium chloride is circulated through both the diluting and concentrating compartments at about 12 cm/sec at room temperature. The sodium chloride solution is prepared from reagent grade sodium chloride and ultrapure water. Care is taken to prevent contamination of the solution by organics and heavy metal oxides and hydroxides. The Cowan-Brown critical current density is found to be about 2.4 milliamperes per sq. cm. After several days of continuous operation at such critical current density it is found that, in the range of from about 100 to about 110% of that current density, about 10% of the current passing through the anion exchange membranes is carried by hydroxide ions.

A sample of anion exchange membrane prepared as above is aged for about one month in 1N sodium hydroxide solution at room temperature. By acid-base titration thereafter it is found that the concentration of weakly basic amines having ionization constants in the range of from about $10^{-3}$ to about $10^{-11}$ is about 0.1 milligram-equivalents per gram of dry resin in the membrane. In the case of this anion exchange membrane, upon degradation by a Lewis base, one of the leaving groups is methanol and the retained bound moiety is polyvinyl benzyl dimethylamine having an ionization constant (determined by acid-base titration with a pH electrode) of about $10^{-4}$.

(b) A solution is prepared containing about:

| | |
|---|---|
| vinyl benzyl pyridinium chloride | 72.8 Kg |
| divinyl benzene (76% of commerce) | 15.4 Kg |
| 1,2-propylene glycol | 67.3 Kg |
| 2-azo-bis-isobutyronitrile | 0.5 Kg |

Anion exchange membranes are prepared from such solution by the same procedure as in part (a) of this example. An ED apparatus is assembled using the anion exchange membranes of this part (b) and CR61AZL cation exchange membranes. As in part (a) of this example an aqueous solution of about 0.05N sodium chloride is circulated through both the diluting and concentrated compartments at about 12 cm/sec at room temperature. The sodium chloride solution is prepared from reagent grade sodium chloride and ultrapure water. Care is taken to prevent contamination of the solution by organics and heavy metal oxides and hydroxides. The Cowan-Brown critical current density is found to be about 2.4 milliamperes per sq. cm. After several days of continuous operation at such critical current density it is found that in the range of from about 100 to about 110% of that critical current, approximately 1% of the current passing through the anion exchange membrane is carried by hydroxide ions.

A sample of anion exchange membrane prepared according to this part (b) is aged for one month in 1N sodium hydroxide solution at room temperature. By acid-base titration thereafter, the concentration of weakly basic moities having ionization constants in the range of from about $10^{-3}$ to about $10^{-11}$ is found to be unmeasurably low. In the case of this anion exchange membrane, upon degradation by a Lewis base, the only leaving group is pyridine and the retained bound moiety is polyvinyl benzyl alcohol which does not have an ionization constant in the range of from about $10^{-3}$ to $10^{-11}$.

Similar results are obtained when vinyl benzyl pyridinium chloride is replaced in whole or in part with vinyl benzyl chloride quaternization products of picoline, lutidine, ethyl pyridine, pyridazine, pyrimidine, pyrazine, quinoline, isoquinoline, cinnoline, quinazoline, quinoxaline, triphenyl amine or triphenyl phosphine.

EXAMPLE 5

Use of Water Splitting CX Membranes and/or AX Membranes Having Diminished Water Splitting (a) Comparative An ED stack is assembled using as CX membranes the comparative membranes prepared according to Example 1 (d) and as AX membranes the comparative membranes prepared according to Example 4(a). The stack is fed a 0.03N solution of sodium chloride through a bed of Amberlite IRA 904 in the chloride form. (Amberlite IRA 904 is a macroreticular, organic scavenging, strong base anion exchange resin. "Amberlite" is a trade name of Rohm and Haas Co., Philadelphia, Pa., U.S.A.). A Cowan-Brown plot of stack resistance versus reciprocal current shows that CX membranes polarize at about 18 milliamperes per sq. centimeter. At about 27 milliamperes per sq. centimeter the AX membranes polarize. The stack is operated at about 30 milliamperes per square centimeter for about a week. The Cowan-Brown plot is repeated and it is found that the CX membranes still polarize at about 18 milliamperes per sq. centimeter. Careful measurements at this current density show no significant change in the pH's of the dilute and concentrate streams. The AX membranes are found still to polarize at about 27 milliamperes per sq. centimeter at which current the concentrate stream becomes alkaline and the dilute stream acidic.

Similar results are obtained when the comparative CX membranes of Example 1(d) are replaced with the comparative CX membranes of Example 1(e) or 1(f).

(b) The CX membranes of part (a) of this example are replaced with CX membranes according to Example 1(a). With the same feed solution as in part (a) of this example and the same pretreatment with scavenging anion exchange resin granules the stack is operated at about 30 milliamperes per sq. centimeter for about a week. A Cowan-Brown plot then shows that the CX membranes polarize at about 18 milliamperes per sq. centimeter but the concentrate stream becomes distinctly acidic and the dilute stream distinctly alkaline. The AX membranes polarize (as in part (a) of this example) at about 27 milliamperes per sq. centimeter but because of water splitting by the CX membranes the concentrate stream does not become significantly alkaline and the dilute stream does not become significantly acidic.

(c) The AX membranes of part (b) of this example are replaced with AX membranes according to Example 4(b). With the same feed solution as in part (a) of this example and the same pretreatment with scavenging anion exchange resin granules the stack is operated at about 30 milliamperes per sq. centimeter for about a week. A Cowan-Brown plot then shows that the CX membranes polarize at about 18 milliamperes per sq. centimeter at which current density the concentrate stream becomes distinctly acidic and the dilute stream distinctly alkaline. The AX membranes polarize (as in parts (a) and (b) of this example) at about 27 milliamperes per sq. centimeter but because of diminished water splitting by the AX membrane (with water substantially free of fouling substances) the concentrate stream remains distinctly acidic and the dilute stream distinctly alkaline.

Similar results are obtained when the scavenging anion exchange resin granules are replaced with dead-end or cross-flow ultrafiltration ("UF") or dead-end or cross-flow nanofiltration ("NF"). (In the case of cross-flow NF the concentration of sodium chloride is reduced slightly in the solution processed and the critical current density is found to decrease in about the same proportion).

EXAMPLE 6

Deashing of Whey

A filled cell electrodialysis (electrodeionization "EDI") stack is assembled containing 25 cell pairs, each membrane having an actual area of about 5 square feet and an effective area of about 3.15 sq. ft. The dilute compartments are filled with equal equivalents of uniformly sized, sulfonic acid type cation exchange granules and uniformly sized, quaternary ammonium type anion exchange granules using the procedures of U.S. Pat. Nos. 5,066,375; 5,120,416 and 5,203,976. The stack is first operated with about 1% aqueous sodium chloride solution at a temperature in the range of 30° to 40° C. At an impressed D.C. potential of about 2 volts per cell pair the current is about 100 amperes and there is no evidence of polarization. The inlet and outlet pressure differentials are controlled within about ±5 inches of water to minimize cross leaks between dilute and concentrate compartments.

The stack is then operated on a batch basis on sweet, cheddar cheese whey which has been pasteurized, concentrated to about 25% solids and clarified. Each batch is about 100 gallons. The concentrated whey has an electrical conductivity of about 16,000 micro-Siemens/cm and a pH of about 6.1. Each batch is recirculated until the outlet whey from the stack has a conductivity of about 500 micro-Siemens/cm at which point the pH is about 4.6. Eight batches of about 100 gallons each are run. The average batch time is about 3.5 hours. The initial voltage is set at about 2.4 to 3.2 volts per cell pair and increased step-wise to about 4.4 volts per cell pair. Unexpectedly there is no evidence of serious fouling of the filled cells by the recirculating whey. It is observed that calcium and other divalent ions are removed at significantly faster rates using filled cell ED ("EDI") than by standard ED (i.e. without ion exchange granule filling in the dilute compartments of the ED stack). It is found that a calcium level of about 150 milligrams per 100 grams of dry whey solids is achieved by filled cell ED at about 80% total ash removal whereas with standard ED about 90% total ash removal is required to meet such calcium level. It is also found that the production rate for filled cell ED is significantly higher than for standard ED. Based on 90% deashing the average production rate for the above eight runs is about 11 pounds of feed solids per hour per cell pair whereas using a standard ED stack with the same size membranes and essentially the same concentrated, clarified, sweet, cheddar cheese whey the production rate is about 6 to 7.5 pounds of feed solids per hour per cell pair. Based on removal of calcium to 150 milligrams per 100 grams dry whey solids the production rate for filled cell ED is found to be about 12.5 pounds of feed solids per hour per cell pair as compared to about 6 to 7.5 pounds per hour per cell pair for standard ED. In addition it is found that at about 90% deashing the current on the filled cell ED stack is about 26 amperes at about 4.4 volts per cell pair whereas with a standard ED stack using the same size membranes at the same extent of deashing the current is only about 12 to 15 amperes, also at about 4.4 volts per cell pair.

After each of the above mentioned eight batch runs, the filled cell stack is cleaned by recirculating in sequence warm water, warm dilute caustic, warm water, warm dilute hydrochloric acid, warm water and either dilute potassium chloride solution or retained blow-down from the concentrate cells of the ED stack.

It is also found advantageous to remove the first 40 to 60 percent of the ash from concentrated whey by standard ED or standard reversing type ED, that is EDR, (i.e. in both cases without ion exchange granules in the diluting compartments of the ED stack) and to complete deashing to 80 to 90% ash removal by filled cell ED or filled cell EDR.

It is further found to be advantageous to remove a first portion of the ash from concentrated whey by standard ED or standard EDR, a second portion by filled cell ED or filled cell EDR and a final portion by standard, chemically regenerated ion exchange e.g. by contacting whey which has been treated by filled cell ED or filled cell EDR first with sulfonic acid type cation exchange granules in the acid form and then with weakly basic anion exchange granules in the free base form as described generally for example in U.S. Pat. No. 4,138,501.

It is found that filled cell ED ("EDI") or filled cell EDR ("EDIR", that is reversing type ED in which both dilute and concentrating compartments are filled with ion exchange granules) may be advantageously applied to other liquid, milk products, for example natural (i.e. not concentrated) sweet whey; whole milk; non-fat milk; natural or concentrated acid whey including cottage cheese whey; the permeate from the ultrafiltration of whole milk, non-fat milk, sweet or acid whey; the permeate from the ultrafiltration of such liquid dairy products which permeate has been concentrated e.g. by reverse osmosis, evaporation or freezing; and the retentate from the ultrafiltration, nanofiltration or reverse osmosis of liquid milk products.

EXAMPLE 7

Improvements in Silica Removal by Filled Cell ED or Filled Cell EDR by Limited pH Adjustment of the Feed to the Filled Cell Stack (a) Comparative A 150 cell pair ED stack is assembled. The membranes have an actual area of about 4645 cm$^2$ and an effective area of about 2930 cm$^2$. The thickness of the dilute compartments is about 0.32 cm and of the concentrate compartments about 0.076 cm. The flow path length in each compartment is about 83.8 cm. The concentrate compartments contain expanded plastic screen. The dilute compartments are filled by the methods of U.S. Pat. Nos. 5,066,375; 5,120,416 and 5,203,976 with a mixture of about 1 part by volume of Dowex Marathon C cation exchange granules and about 1.6 parts of Dowex Marathon A2 anion exchange granules. ("Dowex" and "Marathon" are trade marks of Dow Chemical Co., Midland, Mich. from whom the ion exchange granules are available). The stack is used to demineralize the permeate from a reverse osmosis apparatus. Such permeate has a pH of about 4.56, a silica content of about 190 parts per billion, an electrical conductivity of about 3.4 micro-Siemens/cm and a temperature of about 19° C. The permeate is fed to the above filled cell ED stack at a rate of about 50 gallons per minute of which about 95% is recovered from the dilute compartments of the stack, the remainder from the concentrating and electrode compartments. The feed and outlet pressure differentials are adjusted to minimize cross-leak between the dilute and concentrating compartments. The flow through the concentrating compartments is recirculated on a feed-and-bleed basis. A D.C. potential of about 791 volts (about 5.3 volts per cell pair) is applied to the stack. It is found that at steady state the effluent from the dilute compartments has an electrical conductivity of about 0.082 micro-Siemens/cm (i.e. about a 98% reduction) and a silica content of about 10 parts per billion (i.e. about a 95% reduction). The separation factor for silica as compared to conductivity is about 0.79 i.e. silica has been removed at a rate of which is about 79 percent that of the rate of removal of conductivity. The silica removal is judged to be unsatisfactory.

(b) The reverse osmosis permeate is adjusted to a pH of about 9.01 with aqueous sodium hydroxide at which point it has a temperature of about 19° C., a conductivity of about 3.2 micro-Siemens/cm and a silica content of about 217 parts per billion. The flow to the stack is as described above. A D.C. potential of about 788 volts (5.3 volts per cell pair) is applied to the stack. At steady state the effluent from the dilute compartments has a conductivity of about 0.069 micro-Siemens/cm (about 98% reduction, that is essentially the same as in the first part of this example) and a silica content of about 3.3 parts per billion (about 98% reduction). The separation factor for silica as compared to conductivity is about 1.09. The silica removal is judged to be satisfactory but is completely unexpected: the first ionization constant of silicic acid is about $2\times10^{-10}$ (pK about 9.7) at room temperature. Therefore only about 17% of silica is ionized at a pH of about 9.01.

U.S. Pat. No. 4,298,442 discloses a process for the removal of silica from solution by standard ED in which the solution is adjusted to a pH of at least 9.5. Example 1 thereof shows that with a feed pH of 8.7 only 8% silica was removed in two stages of ED. When the pH of the feed to each stage was adjusted to about 10, the overall silica cut was increased to about 57%. (At pH 10, monomeric, soluble silica is about ⅔rds ionized).

(c) Comparative The above mentioned stack is used further to demineralize a permeate from a reverse osmosis apparatus which permeate has a pH of about 4.32, an electrical conductivity of about 3.2 micro-Siemens/cm, a silica content of about 238 parts per billion and a temperature of about 19° C. A D.C. potential of about 789 volts (5.3 volts per cell pair) is applied to the stack. It is found that at steady state the effluent from the dilute compartments has an electrical conductivity of about 0.080 micro-Siemens/cm (i.e. about a 98% reduction) and a silica content of about 32.5 parts per billion (i.e. about 86% reduction). The separation factor for silica as compared to conductivity is about 0.54.

(d) The reverse osmosis permeate is adjusted to a pH of about 9.02 with caustic at which point it has a temperature of about 22° C., an electrical conductivity of about 4.0 micro-Siemens/cm and a silica content of about 275 parts per billion. A D.C. potential of about 777 volts (5.2 volts per cell pair) is applied. At steady state it is found that the effluent from the dilute compartments has an electrical conductivity of about 0.069 micro-Siemens/cm (a reduction of about 98%) and a silica content of about 8.4 parts per billion (a reduction of about 97%). The separation factor for silica as compared to conductivity is about 0.86.

Results similar to those achieved in parts (b) and (d) of this example are achieved when the feed to the filled cell ED stack or stacks is adjusted to a pH of about 9 by passing all or a part of the feed through a bed of anion exchange granules in the free base or hydroxide form e.g. Amberlite IRA 68, 400, 410, 458, 900, 910 and 958 and similar anion exchange granules.

EXAMPLE 8

Improvements in Silica Removal by Filled Cell ED or Filled Cell EDR Stacks by Controlling the Conductivity of the Concentrate Stream in Such Stacks (a) Comparative Two 150 cell pair stacks are assembled. The membranes have an actual area of about 4645 cm$^2$ and an effective area of about 2930 cm$^2$. The thickness of the dilute compartments is about 0.32 cm and of the concentrate compartments about 0.076 cm. The flow path length in each compartment is about 83.8 cm. The concentrate compartments contain expanded plastic screen. The dilute compartments are filled by the methods of U.S. Pat. Nos. 5,066,375; 5,120,416 and 5,203,976 with a mixture of about 1 part by volume of Dowex Marathon C cation exchange granules and about 1.5 parts of Dowex Monosphere 550A anion exchange granules. ("Dowex", "Marathon" and "Monosphere" are trade marks of Dow Chemical Co., Midland, Mich., U.S.A.). The stacks are used further to demineralize the permeate from a reverse osmosis apparatus. Such permeate has a pH averaging about 6.1, an electrical conductivity averaging about 0.99 micro-Siemens/cm and a silica content averaging about 929 parts per billion. The permeate is fed to the above filled cell ED stacks at a combined rate of about 100 gallons per minute. About 95% is recovered from the dilute compartments of the stacks, the remainder from the concentrating and electrode compartments. The feed and outlet pressure differentials are adjusted to minimize crossleaks between the dilute and concentrating compartments. The flow through the concentrating compartments is recirculated on a feed-and-bleed basis and has a conductivity which averages about 7.5 micro-Siemens/cm. A D.C. potential averaging about 605 volts (4.0 volts per cell pair) is applied to each stack. The average combined current to the two stacks in parallel is about 0.94 amperes. It is found that the effluent from the dilute compartments has a conductivity averaging about 0.068 micro-Siemens (i.e. a 93% reduction) and a silica content averaging about 58 parts per billion (i.e. about a 94% reduction). The separation factor for silica as compared to conductivity is about 1.04.

(b) In a second test with the two stacks of part (a) of this example, sodium chloride solution is added to the recirculating brine (concentrating) stream at a rate such that the average conductivity of the feed to the concentrating compartments is about 279 micro-Siemens/cm. The conductivity of the feed to the filled dilute compartments averages about 1.85 micro-Siemens/cm, the pH averages about 5.6 and the silica content about 801 parts per billion. The average D.C. potential is about 592 volts (i.e. about 3.9 volts per cell pair) and the average combined current to the two stacks in parallel is about 6.9 amperes. The effluent from the filled dilute cells of the ED stacks has a conductivity averaging about 0.113 micro-Siemens/cm (about a 94% reduction) and a silica content averaging about 28 parts per billion (about a 97% reduction). The separation factor for silica as compared to conductivity is about 1.20.

(c) In a third test with the two stacks of part (a) of this example, the brine stream (without salt addition) is recirculated at such a rate that the average conductivity of the feed to the concentrating compartments about 11.3 micro-Siemens/cm. The conductivity of the feed to the filled dilute compartments averages about 1.48 micro-Siemens/cm, the pH averages about 5.9 and the silica content about 573 parts per billion. An average D.C. potential of about 605 volts is applied to the stacks, (about 4.0 volts per cell pair) resulting in an average combined current to the two stacks in parallel of about 1.13 amperes. The effluent from the filled dilute cells of the stacks has a conductivity averaging about 0.085 micro-Siemens/cm (i.e. a reduction of about 94%) and a silica content averaging about 84.5 parts per billion (a reduction of about 84%). The separation factor for silica as compared to conductivity is about 0.67.

In parts (a) and (c) of this example about 6% and 16% respectively of the silica is not removed whereas in part (b) only about 3% of the silica is not removed. It is easily calculated that in parts (a) and (c) of this example the concentrate streams represent about 87% and 81% respectively of the electrical resistance of the stacks whereas in part (b) the concentrate streams represent only about 15% of the electrical resistance of the stack. It is found that whenever filled cell ED (that is, EDI) is used to produce a demineralized product (dilute) having a conductivity of about 10 micro-Siemens/cm or less from a feed containing silica then improved silica removal is obtained when the conductivity of the recirculating concentrate is controlled so that the electrical resistance of the concentrate compartments represents not more than about 50% of the electrical resistance of the filled cell ED or EDR stack, preferably not more than about 20%, most preferably not more than about 10%. It is found generally that for the above mentioned duty there is no substantial advantage to controlling the conductivity of the recirculating concentrate stream so that the electrical resistance of the concentrate compartments represents less than about 10% of the electrical resistance of a filled cell ED or EDR stack. It is speculated that such may be due to increased back-diffusion of electrolyte from the concentrate stream to the dilute stream whenever the electrical resistance of the concentrate stream represents less than about 10% of the electrical resistance of the filled cell stack and/or to unavoidable inter-cell cross-leaks. In this example the conductivity of the concentrate stream was controlled by adding sodium chloride solution. It is found that any suitable source of electrolyte may be used. For example a demineralization train to produce ultrapure water may consist, inter alia, of cation exchange water softening, anion exchange organic scavenging and EDI (filled cell ED) or EDIR (filled cell reversing type ED) in series. The cation and anion exchangers may be regenerated with sodium chloride brine and the spent brine used as a source of electrolyte. Alternatively such a train may comprise cross-flow ultrafiltration ("UF") or microfiltration ("MF"), reverse osmosis ("RO"), EDI or EDIR and mixed bed ion exchange deionization ("MBIX") in series in which case part of the permeate from the UF or MF, part of the retentate from the RO, part of the regenerant from the MBIX (e.g. the spent acid or the mixed spent acid and base) may be used as a source of electrolyte. In a demineralization train, EDI or EDIR may be preceded by ED or EDR and part of the concentrate stream from the latter processes may be used as a source of electrolyte.

EXAMPLE 9

Water Softening and Denitrification With Filled Cell ED or Filled Cell EDR using Monovalent Anion Selective Anion Exchange Granules and Divalent Cation Selective Cation Exchange Granules (a) Comparative An electrodialysis stack is assembled using divalent anion selective AMV anion exchange membranes and divalent cation selective CMV cation exchange membranes, both available from Asahi Glass Co., Tokyo, Japan. The dilute compartments of the stack are filled with equal equivalents of Amberlite IR 120 gel type cation exchange granules and Amberlite IRA 400 gel type anion exchange granules. A synthetic water is prepared having per liter about 48 milligrams calcium chloride, 183 milligrams sodium sulfate and 127 milligrams calcium nitrate. Such water is passed through the filled dilute compartments of the stack at a rate to give a contact time of about 3.75 minutes. A separate portion of such water is recirculated through the concentrate compartments of the stack. The D.C. electric current applied to the stack is about 25% of the limiting current for the filled dilute compartments. It is found that the divalent anions and divalent cations are preferentially removed from the dilute stream compared to monovalent anions and monovalent cations respectively.

Similar results are obtained when the AMV membranes are replaced with other divalent anion selective membranes e.g. with A-201 membranes (Asahi Chemical Industry Co., Tokyo, Japan) or with AM-1 membranes (Tokuyama Soda Co., Tokyo, Japan); the CMV membranes are replaced with other divalent cation selective membranes e.g. with K-101 membranes (Asahi Chemical Industry Co.) or CM-1 membranes (Tokuyama Soda Co., Tokyo, Japan); the Amberlite 120 with other divalent cation selective granules e.g. with Dowex 50 (Dow Chemical Co., Midland, Mich., U.S.A.) or Lewatit S-100 (Bayer A. G., Leverkusen, B. R. D.); and/or the Amberlite IRA 400 is replaced with other divalent anion selective granules e.g. with Dowex 1 or Lewatit M-500.

The above process and apparatus are not efficient for denitrification since divalent anions are removed in preference to nitrate and are not satisfactory for water softening since a high proportion of the electrolyte in the recirculating concentrate stream is the slightly soluble calcium sulfate thus limiting high soft water recovery.

(b) An electrodialysis stack is assembled similar to that of part (a) of this example except the anion exchange membranes are monovalent anion selective ASV, (Asahi Glass Co.) and the anion exchange granules contain monovalent anion selective benzyl tributyl ammonium anion exchange groups and are prepared in accordance with Example 2(b) and 2(d). The synthetic water of part (a) of this example is passed through the filled dilute compartments of the stack at a rate to give a contact time of about 3.75 minutes. A separate portion of such water is recirculated through the concentrate compartments. The D.C. electrical current applied to the stack is about 25% of the limiting current for the filled dilute compartments. It is found that monovalent anions and divalent cations are preferentially removed from the dilute stream compared to divalent anions and monovalent cations respectively.

The above process and apparatus efficiently denitrifies since nitrate is removed in preference to sulfate. (Chloride is found to be removed less preferentially than nitrate). The process and apparatus are satisfactory for water softening since the recirculating concentrate stream contains significantly less sulfate than is found in such stream in part (a) of this example. Therefore high recovery of soft water may be obtained.

Similar results are obtained when the ASV membranes are replaced with other monovalent anion selective membranes e.g. with AMP or AAV membranes (Asahi Glass Co., Tokyo, Japan), A-102 membranes (Asahi Chemical Industry Co.) or ACS membranes (Tokuyama Soda Co.); and the anion exchange granules are replaced with monovalent anion selective granules prepared in accordance with Example 2(a) (or 2(b) or 2(c)) and 2(d) in which the strongly basic anion exchange groups in at least the outer regions of the granules are not members of the group consisting of trimethyl ammonium, methyl diethanol ammonium, ethyl diethanol ammonium, triethanol ammonium, dimethyl ethanol ammonium, diethylethanol ammonium and trimethyl phosphonium; or the anion exchange granules are replaced with monovalent anion selective granules prepared in accordance with Example 2(e) or 2(f).

EXAMPLE 10

Water Denitrification With Filled Cell ED or Filled Cell EDR using Anion Exchange and Cation Exchange Granules Each of Which are Selective to Monovalent Ions An electrodialysis stack is assembled using A-102 anion exchange membranes (Asahi Chemical Industry, Tokyo, Japan) and CMS cation exchange membranes (Tokuyama Soda Co., Tokyo, Japan). The dilute compartments of the stack are filled with equal equivalents of cation exchange granules prepared in accordance with Example 3(b) and anion exchange granules prepared in accordance with Example 2(f). A synthetic water is prepared having per liter about 48 milligrams calcium chloride, 183 milligrams sodium sulfate and 127 milligrams calcium nitrate. Such water is passed through the filled dilute compartments of the stack at a rate to give a contact time of about 3.75 minutes. A separate portion of such water is recirculated through the concentrate compartments of the stack. The D.C. electric current applied to the stack is about 25% of the limiting current for the filled dilute compartments. It is found that monovalent anions and monovalent cations are preferentially removed from the dilute stream compared to divalent anions and divalent cations respectively.

The above process and apparatus are particularly effective for denitrifying water since the recirculating concentrate stream contains a relatively low concentration of divalent anions and divalent cations and therefore may be highly concentrated without the risk of precipitating poorly soluble salts. Similar results are obtained when the monovalent ion selective membranes and granules are replaced with other monovalent ion selective membranes and granules.

EXAMPLE 11

Improved Process and Apparatus for Preparing Ultrapure Water (a) A first electrodialysis stack is assembled using A-102 anion exchange membranes and CMV cation exchange membranes. The dilute compartments are filled with equal equivalents of Amberlite IR 120 gel type cation exchange granules and of anion exchange granules prepared in accordance with Example 2(e) hereof. A synthetic water is prepared having per liter about 48 milligrams calcium chloride, 183 milligrams sodium sulfate and 127 milligrams calcium nitrate. Such water is passed through the filled dilute compartments of the stack at a rate to give more than 90% removal of calcium from such water. The D.C. electric current applied to the stack is about 25% of the limiting current for the filled dilute compartments. The ion product $(Ca^{++})(SO_4^=)$ in the concentrate stream remains well below the solubility product constant of calcium sulfate even at very high softened water recoveries. The bleed from the concentrate compartments is sent to waste.

The softened product of the filled dilute compartments of the first stack is sent to a second electrodialysis stack assembled using AMV anion exchange membranes and CMV cation exchange membranes (Asahi Glass Co.). The dilute compartments of the stack are filled with equal equivalents of Dowex Marathon C cation exchange granules and Dowex Marathon A2 anion exchange granules. The D.C. current applied to such stack is adjusted so that the filled dilute compartments are operated in a highly polarized regime. The concentrate compartments are operated on a feed and bleed basis. It is found that, since the electrolyte in the effluent from the dilute compartments of the above mentioned first (filled cell) electrodialysis stack is primarily sodium sulfate, the ion product $(Ca^{++})(SO_4^=)$ in the concentrate stream in the second stack remains well below the solubility product of calcium sulfate even at very high demineralized water recoveries. The bleed from the recirculating concentrate stream is sent to waste. The effluent from the filled dilute compartments of the second stack is found to be highly demineralized.

(b) A third electrodialysis stack is assembled using AMV anion exchange membranes and CMS cation exchange membranes. The dilute compartments are filled with equal equivalents of cation exchange granules prepared in accordance with Example 3(a) and of Amberlite IRA 400. The synthetic water of part (a) of this example is passed through the filled dilute compartments of such third stack at a rate to give more than 90% removal of sulfate from such water. The D.C. electric current applied to the stack is about 25% of the limiting current for the filled dilute compartments. The ion product $(Ca^{++})(SO_4^=)$ in the concentrate stream remains well below the solubility product constant of calcium sulfate even at very high de-sulfated water recoveries. The bleed from the concentrate compartments is sent to waste.

The de-sulfated product of the filled dilute compartments of this third stack is used (instead of the softened product of the filled dilute compartments of the first stack of part (a) of this example) as feed to the second stack of part (a). Such second stack is operated in the same manner as in part (a). It is found that, since the electrolyte in the effluent from the above mentioned third (filled cell) ED stack is primarily calcium nitrate and chloride, the ion product $(Ca^{++})(SO_4^=)$ in the concentrate stream of the second stack remains well below the solubility product of calcium sulfate even at very high demineralized water recoveries. The bleed from the recirculating concentrate stream is sent to waste. The effluent from the filled dilute compartments of the second stack in this case is also found to be highly demineralized.

EXAMPLE 12

Production of Hypochlorous Acid from Chlorine and Water by Filled Cell ED or Filled Cell EDR An electrodialysis stack is assembled using AAV anion exchange membranes (Asahi Glass Co., Tokyo, Japan which membranes have a low transport number for hydrogen ions in hydrochloric acid solutions as compared to "standard" electrodialysis anion exchange membranes) and NAFION 324 cation exchange membranes (duPont Co., Wilmington, Del., U.S.A., which membranes have a low transport number for chloride ions in hydrochloric acid solutions as compared to "standard" electrodialysis cation exchange membranes). The dense skins of the 324 membranes face the concentration compartments. The dilute compartments of the stack are filled with equal volumes of Amberlite IRA-458 gel type anion exchange granules and Amberlite IR 200 macroporous cation exchange granules. Chlorine gas is bubbled through water at 0° C. until the water becomes cloudy, a sign that the water is saturated with chlorine and chlorine hydrate is beginning to precipitate. The resulting chlorine water is recirculated through the (filled) dilute compartments of the above ED stack and the effluent continuously resaturated with chlorine gas to the cloud point. Dilute hydrochloric acid is recirculated through the concentrate compartments of the stack. A D.C. potential of about 4 volts per cell pair is applied to the stack. The procedure is stopped when the available chlorine concentration in the recirculating dilute stream is about 5.5 percent by weight. The dilute stream is recovered and found by analysis (Can. J. of Chem. 30, 879 (1952)) to have a very low level of free chloride ion. The recovered dilute stream is adjusted to a pH of about 10.5 with 32% sodium hydroxide while maintaining the temperature of the mixture of available chlorine and caustic at a temperature of less than about 30° C. The concentrate stream is recovered, warmed to about 80° C. and stripped of chlorine with air, the recovered chlorine being absorbed in chilled water. The recovered concentrate stream is found to be suitable for acidifying the pure brine feed to the anode compartments of a membrane type chloralkali cell or for acidifying the anolyte effluent from such cell.

Similar results are obtained when the NAFION membranes are replaced with HSV hydrogen ion selective cation exchange membranes (Asahi Glass Co., Tokyo, Japan).

While the principles of the invention have now been made clear in illustrative embodiments, there will be immediately obvious to those skilled in the art many modifications of structure, arrangement, proportions, elements, materials and components used in the practice of the invention which are particularly adapted for specific environments and operating requirements without departing from those principles.

We claim:

1. A process for softening and/or at least partially removing nitrate from an aqueous liquid containing hardness cations and/or nitrate, said process comprising:

passing said liquid through at least diluting compartments of an electrodialysis stack which compartments contain ion exchange granules comprising at least in part anion exchange granules which are selective to monovalent anions compared to divalent anions during electrodialysis at currents substantially less than the limiting current of said anion exchange granules in said compartments, said compartments bounded on their cathode sides by cation exchange membranes which are selective to divalent cations compared to monovalent cations;

passing through said stack a direct electric current which is in the range of currents for which said anion exchange granules remain selective to monovalent anions and said cation exchange membranes remain selective to divalent cations; and collecting at least partially softened and/or partially de-nitrated water from said diluting compartments.

2. A process for softening and/or at least partially de-nitrating an aqueous liquid containing hardness cations and/or nitrate said process comprising:

passing said liquid through diluting compartments of a reversing or non-reversing electrodialysis stack which compartments contain ion exchange granules comprising at least cation exchange granules which are selective to divalent cations compared to monovalent cations during electrodialysis at currents substantially less than the limiting current of said cation exchange granules in said compartments, said compartments bounded on theft anode sides by anion exchange membranes which are selective to monovalent anions compared to divalent anions; and passing through said stack direct current which is in the range of currents for which said cation exchange granules remain selective to divalent cations and said anion exchange membranes remain selective to monovalent anions.

3. A process for softening and/or at least partially de-nitrating water containing hardness cations and/or nitrate, said process comprising:

passing said water through diluting compartments of an electrodialysis stack which compartments contain cation exchange granules selective to divalent cations compared to monovalent cations and also contain anion exchange granules selective to monovalent anions compared to divalent anions;

passing through said stack direct electric current in the range of currents for which said cation exchange granules remain selective to divalent cations and said anion exchange granules remain selective to monovalent anions; and collecting at least partially and/or partially de-nitrated softened water from said diluting compartments.

4. A process for at least partially removing nitrate, calcium and/or magnesium ions from water containing said ions, said process comprising:

passing said water through diluting compartments of an electrodialysis stack which compartments are bounded on their cathode sides by cation exchange membranes which are selective for calcium and magnesium ions relative to monovalent cations and are bounded on their anode sides by anion exchange membranes which are selective for monovalent anions relative to divalent anions, said compartment containing a mixture of anion exchange granules which are selective for monovalent anions relative to divalent anions and cation exchange granules which are selective for calcium and magnesium ions relative to monovalent cations;

passing through said stack direct current in the range of currents for which said cation exchange membranes and said cation exchange granules remain selective for calcium and magnesium and said anion exchange membranes and said anion exchange granules remain selective for monovalent anions; and recovering from said dilute compartments water having a reduced content of nitrate, magnesium and/or calcium ions.

5. A process for at least partially demineralizing water comprising:

passing said water through first diluting compartments of an electrodialysis stack which compartments are separated on their cathode sides from first concentrating compartments by cation exchange membranes which are selective for divalent cations relative to monovalent cations and are separated on their anode sides from said first concentrating compartments by anion exchange membranes which are selective for monovalent anions relative to divalent anions, said first diluting compartments containing a mixture of anion exchange granules which are selective for monovalent anions relative to divalent anions and cation exchange granules which are selective for divalent cations relative to monovalent cations;

passing water through said first concentrating compartments and optionally recycling at least part of the effluent from said first concentrating compartments through said first concentrating compartments;

passing through said first diluting compartments and said first concentrating compartments direct current in the range of currents for which said cation exchange membranes and said cation exchange granules remain selective for divalent cations and said anion exchange membranes and anion exchange granules remain selective for monovalent anions;

passing the effluent from said first diluting compartments through second diluting compartments of an electrodialysis stack which compartments are separated on their cathode sides from second concentrating compartments by cation exchange membranes and are separated on their anode sides from said second concentrating compartments by anion exchange membranes, said second diluting compartments containing ion exchange granules;

passing water through said second concentrating compartments and optionally recycling at least part of the effluent from said second concentrating compartments through said second concentrating compartments;

passing direct current through said second diluting compartments and said second concentrating compartments; and recovering at least partially demineralized water from said second diluting compartments.

6. A process according to claim 5 wherein said direct current passing through said second diluting compartments and said second concentrating compartments is in excess of the limiting current for said second diluting compartments.

7. A process according to claim 5 wherein at least part of the effluent from said first concentrating compartments is recycled through said first concentrating compartments and the remainder of said effluent is sent to waste and in which at least part of the effluent from said second concentrating compartments is recycled through said second concentrating compartments and the remainder of said effluent is sent to waste.

8. A process for at least partially demineralizing water which process comprises:

passing said water through first diluting compartments contained in an electrodialysis stack which compartments are separated on their cathode sides from first concentrating compartments by cation exchange membranes which are selective for monovalent cations relative to divalent cations and are separated on their anode sides from said first concentrating compartments by anion exchange membranes which are selective for divalent anions relative to monovalent anions, said first diluting compartments containing a mixture of anion exchange granules which are selective for divalent anions relative to monovalent anions and cation exchange granules which are selective for monovalent cations relative to divalent cations;

passing water through said first concentrating compartments and optionally recycling at least part of the effluent from said first concentrating compartments through said first concentrating compartments;

passing through said first diluting compartments and said first concentrating compartments direct current in the range of currents for which said cation exchange membranes and said cation exchange granules remain selective for monovalent cations and said anion exchange membranes and anion exchange granules remain selective for divalent anions;

passing the effluent from said first diluting compartments through second diluting compartments contained in an electrodialysis stack which compartments are separated on their cathode sides from second concentrating compartments by cation exchange membranes and are separated on their anode sides from said second concentrating compartments by anion exchange membranes, said second diluting compartments containing ion exchange granules;

passing water through said second concentrating compartments and optionally recycling at least part of the effluent from said second concentrating compartments through said second concentrating compartments;

passing direct current through said second diluting compartments and said second concentrating compartments;

recovering at least partially demineralized water from said second diluting compartments.

9. A process according to claim 8 wherein said direct current passing through said second diluting compartments and said second concentrating compartments is in excess of the limiting current for said second diluting compartments.

10. A process according to claim 8 wherein at least part of the effluent from said first concentrating compartment is recycled through said first concentrating compartments and the remainder of said effluent is sent to waste and in which at least part of the effluent from said second concentrating compartments is recycled through said second concentrating compartments and the remainder of said effluent is sent to waste.

11. A process for removing at least in part nitrate from water, said process comprising:

passing said water through diluting compartments of an electrodialysis stack which compartments are bounded on their cathode sides by cation exchange membranes which are selective for monovalent cations relative to divalent cations and are bounded on their anode sides by anion exchange membranes which are selective for monovalent anions relative to divalent anions, said compartments containing a mixture of anion exchange granules which are selective for monovalent anions relative to divalent anions and cation exchange granules which are selective for monovalent cations relative to divalent cations;

passing through said stack direct current in the range of currents for which said cation exchange membranes and said cation exchange granules remain selective for monovalent cations and said anion exchange membranes and said anion exchange granules remain selective for monovalent anions; and recovering from said dilute compartments water having a reduced content of nitrate ions.

* * * * *